United States Patent
Chang et al.

(10) Patent No.: US 6,927,759 B2
(45) Date of Patent: Aug. 9, 2005

(54) OPTICAL MOUSE WITH UNIFORM LIGHT PROJECTION

(75) Inventors: Wei Chang, San Chung (TW); Hsien-yeh Hung, San Chung (TW)

(73) Assignee: Unity Opto Technology Co., Ltd., Taipei Hsien (TW)

( * ) Notice: Subject to any disclaimer, the term of this patent is extended or adjusted under 35 U.S.C. 154(b) by 19 days.

(21) Appl. No.: 10/455,379

(22) Filed: Jun. 6, 2003

(65) Prior Publication Data

US 2004/0246233 A1 Dec. 9, 2004

(51) Int. Cl.[7] .................................................. G09G 5/08
(52) U.S. Cl. ....................... 345/166; 345/164; 345/167; 345/163
(58) Field of Search ................................ 345/156–160, 345/162–168, 184, 145, 123, 185; 358/473; 250/557, 559; 382/313–324, 150

(56) References Cited

U.S. PATENT DOCUMENTS

| | | | | |
|---|---|---|---|---|
| 5,994,710 A | * | 11/1999 | Knee et al. ................. | 250/557 |
| 6,281,881 B1 | * | 8/2001 | Siddiqui et al. ............. | 345/164 |
| 6,344,846 B1 | * | 2/2002 | Hines ......................... | 345/166 |
| 6,433,780 B1 | * | 8/2002 | Gordon et al. .............. | 345/166 |
| 2002/0021277 A1 | * | 2/2002 | Kramer et al. .............. | 345/156 |
| 2002/0190953 A1 | * | 12/2002 | Gordon et al. .............. | 345/166 |
| 2003/0058222 A1 | * | 3/2003 | Casebolt et al. ............ | 345/163 |
| 2003/0099393 A1 | * | 5/2003 | Oshiumi et al. ............ | 382/150 |

* cited by examiner

*Primary Examiner*—Vijay Shankar
*Assistant Examiner*—Prabodh Dharia
(74) *Attorney, Agent, or Firm*—Troxell Law Office, PLLC

(57) ABSTRACT

An optical mouse includes a bottom casing, a top cover mounted to the bottom casing to define an interior space. A circuit board and a lens set are located in the interior space. The bottom casing has an opening. A detecting device is mounted to the circuit board. A receiving portion and a light emitting diode (LED) are mounted to a bottom side of the detecting device in alignment with a slot in the circuit board. A solder pad to which an electrical conductor is connected has a central bore and is positioned on a circumferential margin of a light projection surface of the LED to allow light projected from the light projection surface to transmit through the central bore. The lens set is located between the circuit board and the bottom casing, and includes a reflection member and a lens.

2 Claims, 5 Drawing Sheets

OPTICAL MOUSE WITH UNIFORM LIGHT PROJECTION

FIELD OF THE INVENTION

The present invention generally relates to an optic mouse, and in particular to an optical mouse that uniformly projects light to be reflected and detected by a sensor whereby assembly thereof is simplified and transmission of light is enhanced. The present invention is suitable for all kinds of optical mouse and similar devices.

BACKGROUND OF THE INVENTION

Conventionally, a computer mouse comprises a bottom casing and a top cover mounted to the bottom casing, defining an interior space therebetween for accommodating a circuit board. The circuit board is fixed to the bottom casing and comprises a tracking module substantially aligned with an opening defined in the bottom casing. The tracking module comprises a track ball rotatably mounted inside the mouse and partially projects beyond the bottom casing for engaging a fixture surface on which the mouse is moved. The track ball is rotated when the mouse moves on the fixture surface. The rotation of the track ball is converted into electrical signal that is transmitted through an electrical cable soldered to the circuit board to a host computer.

Since the conventional mouse is electrically connected to the host computer by an electrical cable that is soldered to the circuit board of the mouse, a portion of the interior space of the mouse must be occupied by the cable. In addition, the cable that connects the mouse to the host computer imposes limitation to the movement of the mouse on the fixture surface. Thus, an operator is not allowed to completely freely move the mouse to obtain the best operability thereof. Further, dusts may get into the mouse by the rotation of the track ball. This may induce poor engagement between components of the mouse in generating and transmission of the signal indicating the movement of the mouse.

An optic mouse overcomes at least the dust problem by generating the movement signal of the mouse by means of detection of reflection light. The optic mouse comprises a bottom casing and a top cover attached to the bottom casing with a circuit board fixed between the casing and the cover. An illuminating element, such as a light emitting diode (LED), is mounted to the circuit board for projecting a light beam through an opening defined in the bottom casing. The light beam is reflected by a fixture surface on which the mouse is moved. The reflected beam transmits through the opening of the casing and detected by a sensor substantially aligned with the opening. A set of optical elements, including lenses, is arranged between the circuit board and bottom casing for directing and transmitting the light beam from the illuminating element to the sensor.

The conventional optical mouse, however, suffers non-uniform projection of light from the illuminating element, which is generally an LED. As shown in FIG. 1 of the attached drawings, the LED comprises a chip 1 having a light projection surface from which the light beam is projected. A solder pad 2 is formed on a central portion of the light projection surface for connection with electrical conductors through which electricity is transmitted to the LED. The solder pad 2, due to being located on a central portion of the light projection surface, blocks a substantially amount of light projected from the light projection surface, forming a dark zone, whereby light projected out of the mouse is not uniform. Such a non-uniform light beam, after being reflected by the fixture surface, induces a poor detection signal on the sensor.

SUMMARY OF THE INVENTION

Therefore, a primary object of the present invention is to provide an optical mouse which projects a uniform light beam for detection of movement of the mouse and an excellent transmission of light can be obtained.

Another object of the present invention is to provide an optical mouse of which the assembly is simplified.

A further object of the present invention is to provide an optical mouse having excellent result of detection and transmission of light in the mouse.

To achieve the above objects, in accordance with the present invention, there is provided an optical mouse comprising a bottom casing, a top cover mounted to the bottom casing to define an interior space therebetween, a circuit board and a lens set arranged in the interior space. The bottom casing defines an opening. A detecting device is mounted to the circuit board. A receiving portion and a light emitting diode (LED) are mounted to a bottom side of the detecting device in alignment with a slot defined in the circuit board. A solder pad to which an electrical conductor is connected forms a central bore and is positioned on a circumferential margin of a light projection surface of the LED to allow light projected from the light projection surface to transmit through the central bore. The lens set is arranged between the circuit board and the bottom casing, comprising a reflection member located below the LED for redirecting the light from the LED to the fixture surface and a lens, which is located below the receiving portion of the detecting device and in alignment with the opening of the bottom casing, converging the reflected light toward the receiving portion of the detecting device. Since the light from the LED is allowed to pass through the central bore of the solder pad and is not substantially blocked by the solder pad, a uniform projection of light can be accomplished. The assembly of the optical mouse is simplified and an excellent transmission of light can be realized.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
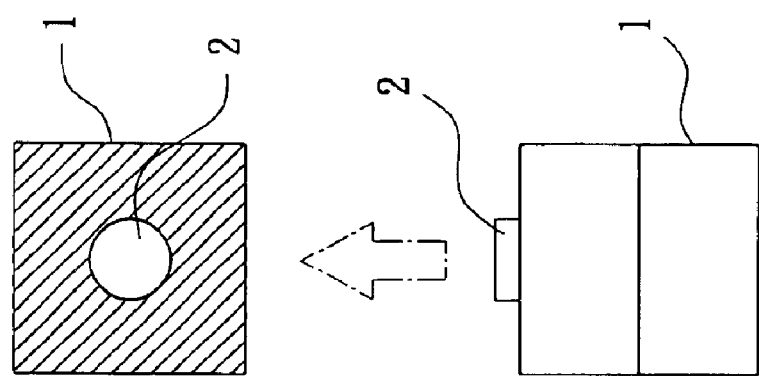
FIG. 1 is a schematic view showing a solder pad positioned on a central portion of a light emitting diode chip, in which the lower portion of the drawing is a side elevational view, while the upper portion is a top plan view.

With reference to the drawings and in particular to FIGS. 1–4, an optical mouse constructed in accordance with the present invention comprises a housing 10 comprising a bottom casing 12 to which a top cover 11 is mounted, defining an interior space therebetween for accommodating a circuit board 20 and a lens set 30. The bottom casing 12 defines an opening 121.

The circuit board 20 is fixed in the bottom casing 12 and defines a slot 22 substantially aligned with the opening 121 of the bottom casing 12. A detecting device 21 is mounted on the circuit board 20 at a location substantially aligned with the slot 22. On a bottom side of the detecting device 21, a receiving portion 211 of the detecting device 21 and an illuminating device 212 are mounted whereby the receiving portion 211 is substantially aligned with the opening 121 of the bottom casing 12.

The illuminating device 212, which is a light emitting diode device in the embodiment illustrated, comprises a chip 213 having a light projection surface (not labeled) from which a light beam is projected. A solder pad 214 that defines a central bore (not labeled) is mounted on the light projection surface for electrical connection with an electrical conductor 215. Thus, due to the central bore, the solder pad 214 is positioned on a circumferential margin of the light projection surface of the chip 213.

The lens set 30 is fixed on the bottom casing 12 and is arranged between the circuit board 20 and the bottom casing 12. The lens set 30 comprises a first lens 31, a reflection member 32 and a second lens 33. The first lens 31 is located below the light emitting diode device 212 and the reflection member 32 is below the first lens 31. The second lens 33 is substantially aligned with and located below the receiving portion 211 of the detecting device 21. The second lens 33 is also aligned with the opening 121 of the bottom casing 12.

Apparently, a feature of the optical mouse in accordance with the present invention is that in the light emitting diode device 212 that is mounted to the bottom side of the detecting device 21, the solder pad 214 is arranged on a circumferential margin of the light projection surface of the chip 213 for connection with the electrical conductor 215. Due to such a structure, the light projected from the light projection surface of the chip 213 is allowed to travel through the central bore of the solder pad 214 and not blocked by the solder pad 214. A uniform light beam is thus obtained. The light beam from the light emitting diode device 212 transmits through the first lens 31 and is then redirected by the reflection member 32 toward a fixture surface 40 (FIG. 5), such as a desk surface. The light beam is reflected by the fixture surface 40 and the reflected light is received and converged by the second lens 33 onto the receiving portion 211 of the detecting device 21. Thus, change of the fixture surface 40 caused by movement of the mouse on the fixture surface 40 can be detected by the reflected light received by the detecting device and a detection signal is transmitted to a host computer to which the mouse is coupled. To summarize, the light emitting diode device 212 projects a uniform light beam, which transmits through the lens set 30, with the aid of the fixture surface 40, and received by the receiving portion 211 of the detecting device 21. Excellent transmission of the light beam between the light emitting diode device 212 and the detecting device 21 is realized.

Figure 5:
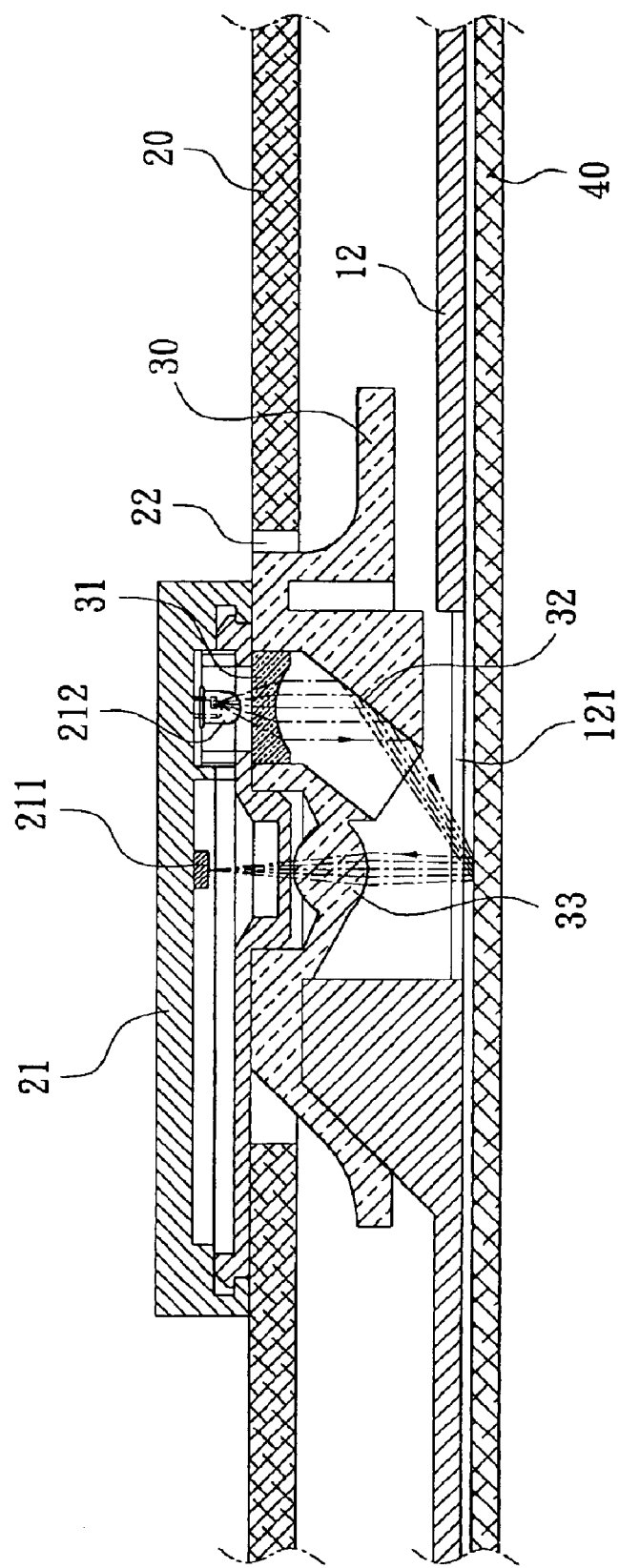
FIG. 5 is a cross-sectional view of the optical mouse of the present invention illustrating the operation thereof.

Also referring to FIG. 5, to operate, the mouse is positioned on the fixture surface 40, such as a desk surface, and the light emitting diode device 212 continuously gives off light. By moving the mouse on the fixture surface 40, the light from the light emitting diode device 212 travels through the slot 22 of the circuit board 20, transmitting through the first lens 31 toward the reflection member 32 whereby the light is redirected through the opening 121 of the bottom casing 12 to the fixture surface 40. The fixture surface 40 reflects the light and the reflected light transmits through the second lens 33 toward the receiving portion 211 of the detecting device 21. Thus, change of the fixture surface 40 caused by movement of the mouse can be detected by the detecting device 21 and a corresponding detection signal is transmitted to the host computer.

Figure 2:
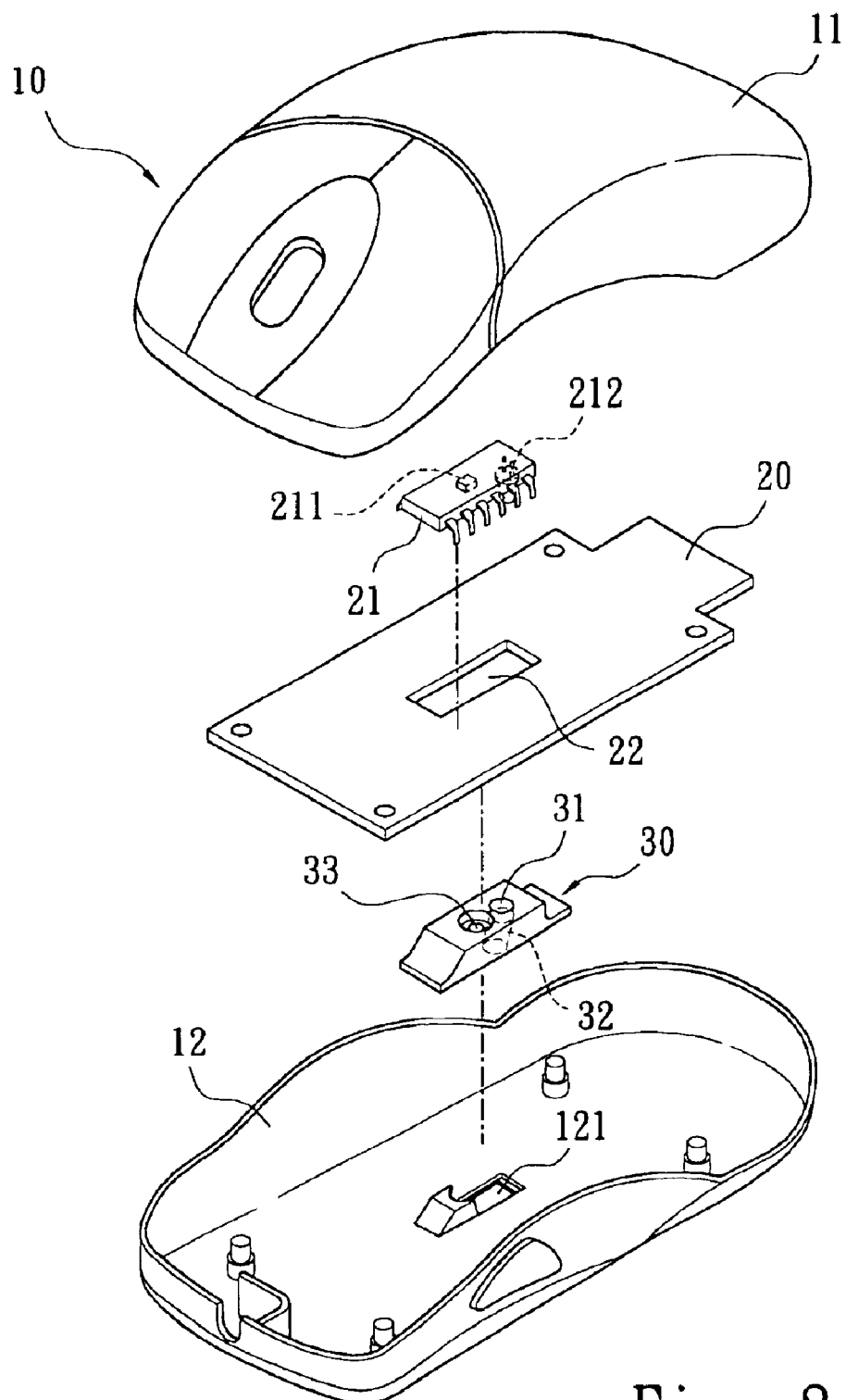
FIG. 2 is an exploded view of an optical mouse constructed in accordance with the present invention.
Figure 3B:
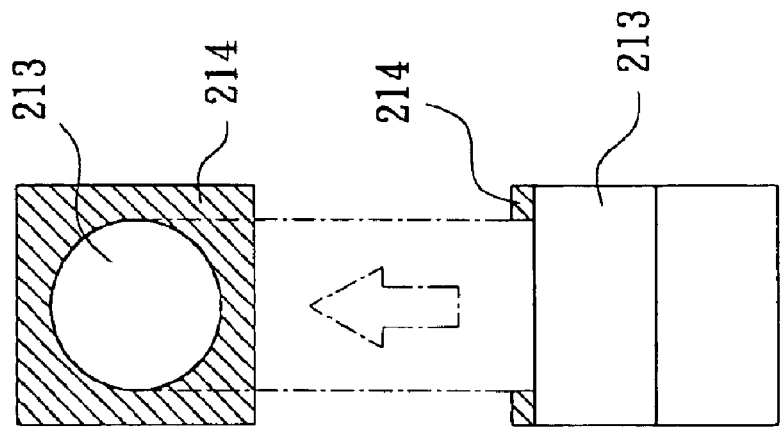
FIG. 3b schematically shows a light emitting diode chip employed in the illuminating device of the present invention wherein the lower portion of the drawing is a side elevational view of the light emitting diode chip, while the upper portion is a top plan view.
Figure 3A:
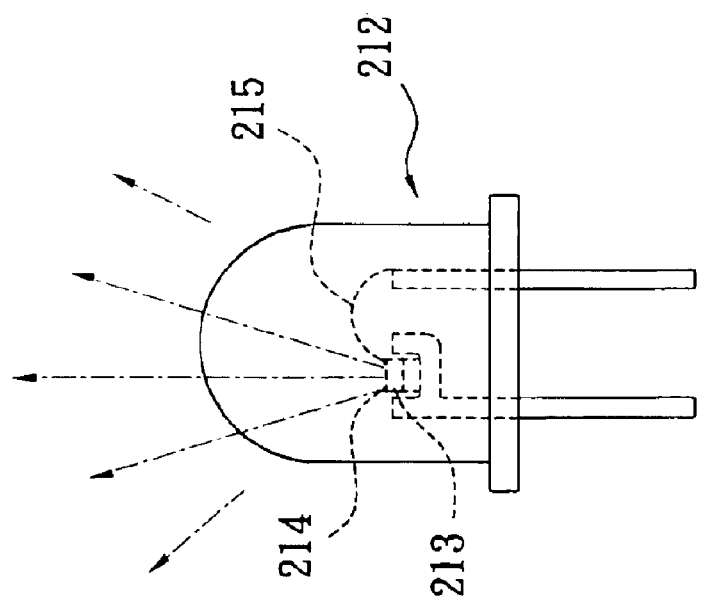
FIG. 3a is a side elevational view of an illuminating device constructed in accordance with the present invention.
Figure 4:
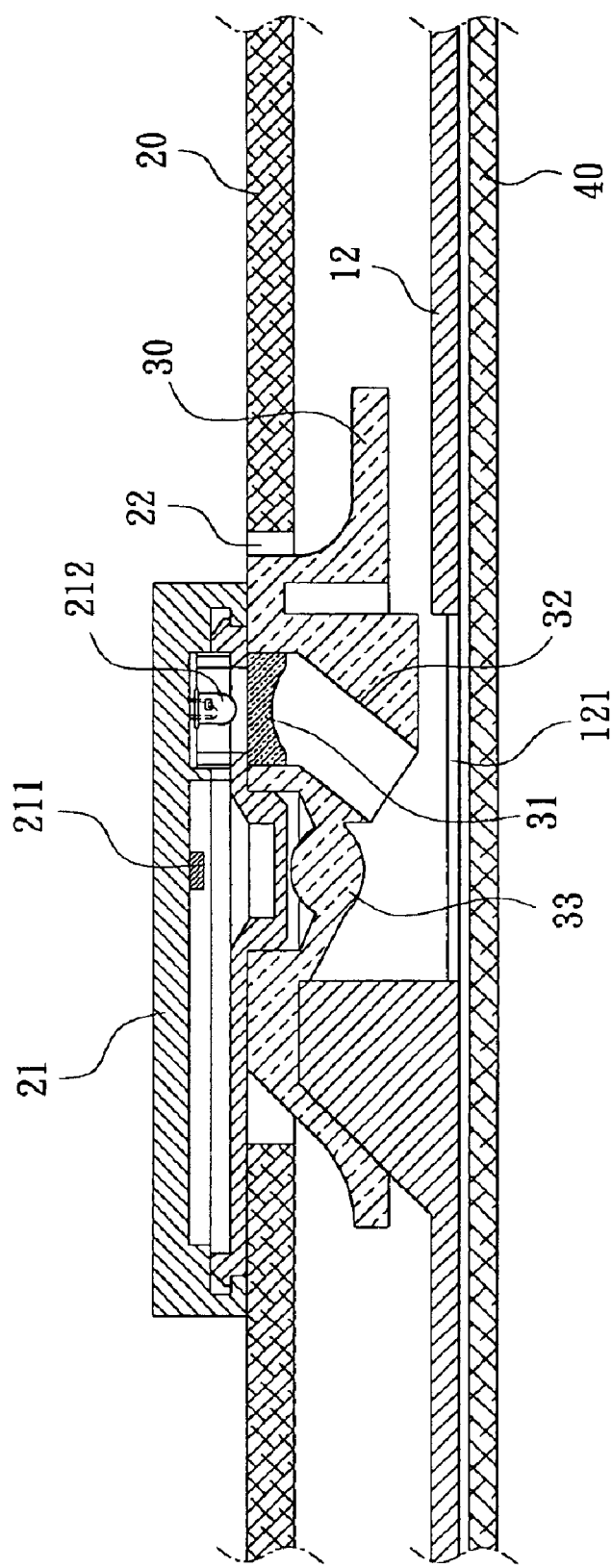
FIG. 4 is a cross-sectional view of the optical mouse of the present invention.

In the embodiment illustrated in FIGS. 2, 4 and 5, the lens set 30 comprises the first lens 31, the reflection member 32 and the second lens 33 for directing the light from the light emitting diode device 212. However, the first lens 31 may be omitted whereby the lens set 30 comprises only the reflection member 32 and the second lens 33. In this case, the reflection member 32 is located below the light emitting diode device 212, while the second lens 33 is located below the receiving portion 211 of the detecting device 21 and I alignment with the opening of the bottom casing for receiving the reflected light.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An optical mousing comprising:
   a) a housing having:
      i) a top cover; and
      ii) a bottom casing connected to the top cover and forming an interior therebetween, the bottom casing having an opening;
   b) a circuit board located in the interior and having:
      i) a detecting device;
      ii) a receiving portion located on a bottom of the detecting device and aligned with the opening; and
      iii) an illumination device located on the bottom of the detecting device and having a chip having a light projection surface projecting a light beam, a solder pad connected to the light projection surface and having a central bore, and an electrical conductor connected to the solder pad, the light beam projecting through the central bore; and
   c) a lens set connected to the bottom casing below the circuit board and having:
      i) a reflection member located below the illumination device; and
      ii) a first lens located below the receiving portion and aligned with the opening of the bottom casing.

2. The optical mousing according to claim 1, further comprising a second lens located between the illumination device and the reflection member.

* * * * *